UNITED STATES PATENT OFFICE.

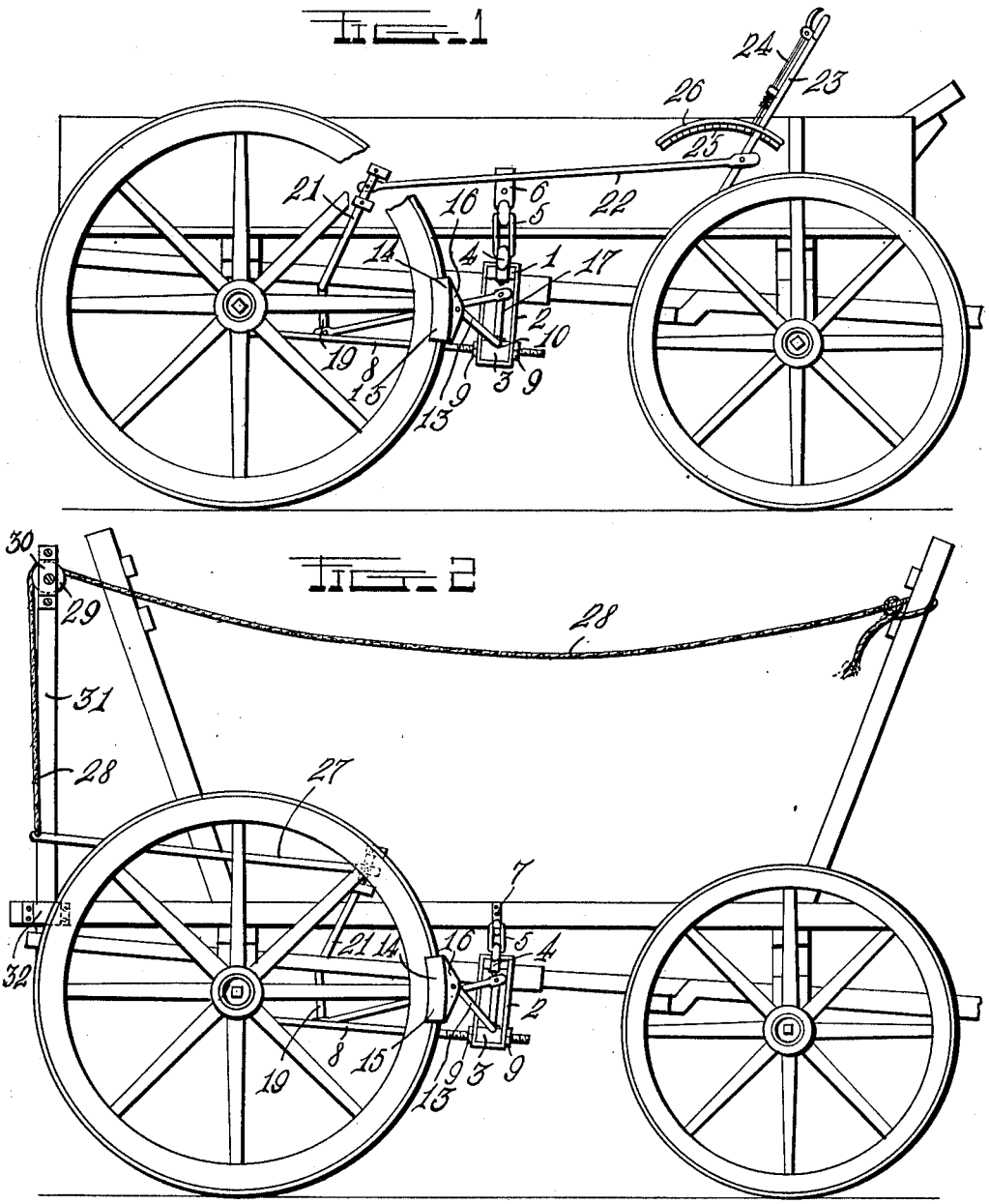

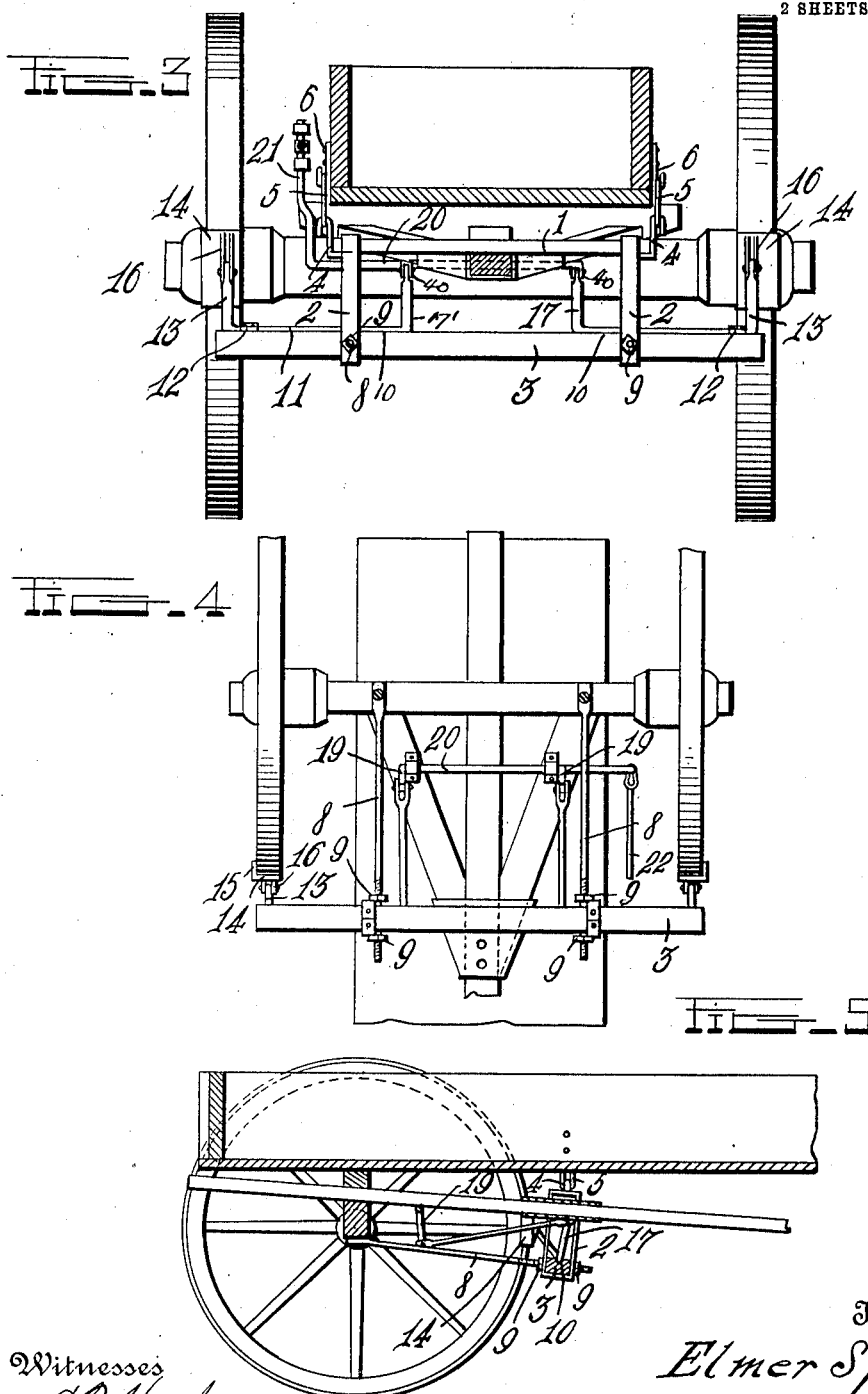

ELMER SPIRES, OF OKLAHOMA, OKLAHOMA.

WAGON-BRAKE.

1,020,851.  Specification of Letters Patent.  Patented Mar. 19, 1912.

Application filed March 10, 1910, Serial No. 548,382. Renewed July 21, 1911. Serial No. 639,865.

*To all whom it may concern:*

Be it known that I, ELMER SPIRES, a citizen of the United States, residing at Oklahoma city, in the county of Oklahoma and State of Oklahoma, have invented certain new and useful Improvements in Wagon-Brakes; and I do declare the following to be a full, clear, and exact description of the invention, such as will enable others skilled in the art to which it appertains to make and use the same.

This invention relates to improvements in wagon brakes.

The object of the invention is to improve the construction and arrangement of the brake shown in United States Patent No. 629,017 granted to me July 18th, 1899, whereby the same may be employed in connection with a box or body or with a hay rack, and whereby the brake mechanism will be strengthened and the efficiency of the brake increased.

With the foregoing and other objects in view, the invention consists of certain novel features of construction, combination and arrangement of parts, as will be more fully described and particularly pointed out in the appended claim.

In the accompanying drawings: Figure 1 is a side view of a wagon running gear showing a box or body arranged thereon and my improved brake applied thereto; Fig. 2 is a similar view with a hay rack body showing the application of the invention; Fig. 3 is a vertical cross section taken immediately in front of the brake beam and looking toward the rear of the wagon shown in Fig. 1; Fig. 4 is a bottom plan view of the rear end of the running gear; Fig. 5 is a vertical, longitudinal section of the same.

In carrying out my present improvements, I secure to the running gear an upper cross beam 1, on the ends of which are secured hangers 2 having a lower cross bar 3 secured to their lower end. On the ends of the upper cross bar are hooks 4 engaging links 5 adapted to engage hooks 6 on the wagon box or smaller hooks 7 on the frame of the hay rack, as clearly shown in Figs. 1 and 2. To increase the rigidity of the apparatus and enhance its efficiency, I employ fastening rods 8 which have their rear ends bolted or otherwise rigidly secured to the axle, as shown. The threaded forward ends of the said rods are inserted through suitable apertures formed in the lower cross bars and on said ends are mounted clamping nuts 9 which are turned home against the opposite sides of the cross bar and thereby rigidly hold said bar against forward or rearward movement and, consequently, maintain the brake shaft at a fixed distance from the wheels so that the stroke needed to bring the shoes against the wheels will remain constant.

In the upper side of the lower cross bar 3 of the brake supporting frame is formed a longitudinally disposed groove or channel 10 in which is loosely mounted a brake shaft 11, said shaft being held in said groove by means of clips 12, or other suitable fastening devices. The ends of the brake shaft 11 are bent at right angles and project rearwardly to form brake shoe supporting arms 13 to the outer ends of which are loosely connected brake shoes 14. The shoes are preferably formed of steel plates and are provided on their outer edges with right angular flanges 15 which engage the outer edges of the tire of the wheel as shown while on their front sides are formed pairs of apertured ears or lugs 16 with which are pivotally connected the outer ends of the supporting arms 13.

The peculiar form of the brake shoes exerts a braking action against the side of the wheels as well as against the treads thereof so that the wheels will be effectually held against rotation.

The central portion of the brake shaft 11 is formed into an upwardly projecting crank arm 17 which is connected by a link to depending crank arms 19 on an operating shaft 20 which is journaled in suitable bearings on the running gear. Upon one side of the operating shaft 20 is formed an upwardly projecting crank arm 21 connected by a rod 22 to a hand lever 23 arranged at or near the front end of the wagon box. The lever 23 carries a pawl 24 which engages the teeth of a segmental rack 25 provided with a gear 26, as shown in Fig. 1.

In Fig. 3 of the drawings I provide two separate brake shafts 11, having two upwardly disposed crank arms 17: the horizontal portions of said shafts being mounted in channels 30, in the lower cross bar 3, said crank arms 17: having their upper ends connected to links 14, on the horizontal portions 20, of a projecting crank arm 21.

The brake lever 23 and its connections just described are adapted for use in connection with an ordinary wagon body and are practically the same as shown in my previous patent hereinbefore referred to.

In addition to the operating mechanism just described, I provide a supplemental operating mechanism for use in connection with a hay rack wherein the before mentioned operating mechanism could not be readily employed. The supplemental operating mechanism referred to comprises a rearwardly extending operating rod 27 the forward end of which is pivotally connected to the crank arm 21 on the end of the operating rod or shaft 20 of the brake mechanism. To the rear end of the operating rod 27, is connected an operating cord or cable 28 which extends upwardly and passes over a guide pulley 29 revolubly mounted in a bracket 30 on the upper end of a post or standard 31, the lower end of which is reduced and is detachably engaged with a suitable keeper 32 secured to the frame of the hay rack. After passing through the guide pulley 29, the cable or cord 28 extends forwardly to the front end of the hay rack or to the top of the load within convenient reach of the driver who by means of said cable may operate the brake when desired. On the crank arm 21 of the operating shaft 20 are secured sockets or keepers 33 with which may be engaged the lower ends of an extension not shown but by means of which the crank arm may be extended upwardly to any desired length.

By providing the supplemental brake operating mechanism as herein shown and described, in addition to the regular brake operating mechanism for a wagon body, the brake may be operated by the driver on top of a load of hay as readily as when sitting on the seat of the wagon. In making the change from one operating mechanism to another, as when the wagon body is removed and replaced by the hay rack, the inner end of the connecting rod 22 is disconnected from the crank arm 21 of the operating shaft 20 and the links 5 disconnected from the hooks 6 of the wagon box after which the box may be removed from the running gear and the hay rack placed thereon. The operating rod 27 is now connected with the crank arm 21 of the operating shaft 20 and the operating cord or cable passed to the guide pulley 29 and extended through the front end of the hay rack in position to be taken up on top of the load, whereby the driver may operate the brake from his position on the load.

From the foregoing description, taken in connection with the accompanying drawings, the construction and operation of the invention will be readily understood without requiring a more extended explanation.

Having thus described my invention, what I claim is:—

The combination with the running gear of a wagon, of an upper cross-bar secured thereon, a lower cross-bar suspended from said upper cross-bar, and having a channel therein, fastening rods secured to the axle of the running gear and having their forward ends rigidly secured to said lower cross-bar, a pair of brake shafts adapted to rotate in said channel and having upwardly extending arms at opposite ends, a crank shaft having a horizontal portion provided with links to which are attached the upper ends of the inner arms of said brake shafts, brake shoes on said outer arms of said brake shafts, and a rod connected to the brake shaft having a lever connected therewith.

In testimony whereof I have hereunto set my hand in presence of two subscribing witnesses.

ELMER SPIRES.

Witnesses:
A. H. DENNEY,
Mrs. I. W. THOMPSON.

Copies of this patent may be obtained for five cents each, by addressing the "Commissioner of Patents, Washington, D. C."